United States Patent
Chiba et al.

(10) Patent No.: US 12,462,026 B2
(45) Date of Patent: Nov. 4, 2025

(54) GENERATION DEVICE, GENERATION METHOD, AND GENERATION PROGRAM

(71) Applicant: NTT, Inc., Tokyo (JP)

(72) Inventors: Daiki Chiba, Musashino (JP); Mitsuaki Akiyama, Musashino (JP)

(73) Assignee: NTT, Inc., Tokyo (JP)

( * ) Notice: Subject to any disclaimer, the term of this patent is extended or adjusted under 35 U.S.C. 154(b) by 126 days.

(21) Appl. No.: 18/272,802

(22) PCT Filed: Jan. 20, 2021

(86) PCT No.: PCT/JP2021/001920
§ 371 (c)(1),
(2) Date: Jul. 18, 2023

(87) PCT Pub. No.: WO2022/157867
PCT Pub. Date: Jul. 28, 2022

(65) Prior Publication Data
US 2024/0303330 A1    Sep. 12, 2024

(51) Int. Cl.
*G06F 21/55* (2013.01)
*G06F 21/56* (2013.01)

(52) U.S. Cl.
CPC ............ *G06F 21/56* (2013.01); *G06F 21/562* (2013.01)

(58) Field of Classification Search
CPC ......... G06F 21/56; G06F 21/562; G06F 21/55
See application file for complete search history.

(56) References Cited

U.S. PATENT DOCUMENTS

| | | | | |
|---|---|---|---|---|
| 2006/0015630 A1* | 1/2006 | Stolfo | .................. | G06F 21/563 709/230 |
| 2015/0026808 A1* | 1/2015 | Perdisci | ............... | H04L 63/145 726/23 |
| 2016/0357965 A1* | 12/2016 | Prowell | ................. | G06F 21/566 |
| 2017/0063910 A1* | 3/2017 | Muddu | ................. | G06F 3/0482 |
| 2018/0288087 A1* | 10/2018 | Hittel | .................... | H04L 63/145 |
| 2019/0073474 A1* | 3/2019 | Zhang | ..................... | G06F 21/56 |
| 2024/0004993 A1* | 1/2024 | Rozenberg | ............ | G06F 21/554 |

FOREIGN PATENT DOCUMENTS

| | | | | |
|---|---|---|---|---|
| CN | 107368856 A | * | 11/2017 | .......... G06F 21/562 |
| CN | 108170467 A | | 6/2018 | |

(Continued)

OTHER PUBLICATIONS

Extended European Search Report issued Sep. 30, 2024 in European Patent Application No. 21920981.4, 10 pages.

(Continued)

*Primary Examiner* — Jayesh M Jhaveri
(74) *Attorney, Agent, or Firm* — XSENSUS LLP

(57) ABSTRACT

A generation device includes generation circuitry configured to acquire information on software, extract a feature quantity of the software from the information of the software acquired, generate a cluster for each software on the basis of the feature quantity extracted, calculate a clustering result including a center of gravity of the cluster, match the clustering result calculated with the past clustering result when a distance between a center of gravity of a cluster included in the past clustering result calculated from information on malware is equal to or less than a predetermined value, and generate a graph representing a relationship between the software and the malware on the basis of a result of matching.

6 Claims, 8 Drawing Sheets

(56) References Cited

FOREIGN PATENT DOCUMENTS

| | | | | |
|---|---|---|---|---|
| CN | 109074454 A | * 12/2018 | ............. | G06F 21/55 |
| CN | 110110177 A | 8/2019 | | |
| CN | 111090859 A | 5/2020 | | |
| CN | 107368856 B | * 10/2021 | ........... | G06F 21/562 |
| KR | 10-2016-0119295 A | 10/2016 | | |
| KR | 20250069361 A | * 5/2025 | ............. | G06F 21/56 |

OTHER PUBLICATIONS

Aafer et al., "DroidAPIMiner: Mining API-Level Features for Robust Malware Detection in Android", Institute for Computer Sciences, Social Informatics and Telecommunications Engineering, SecureComm 2013, LNICST, vol. 127, 2013, pp. 86-103.

Arp et al., "DREBIN: Effective and Explainable Detection of Android Malware in Your Pocket", NDSS'14, Feb. 23-26, 2014, pp. 1-15.

Mariconti et al., "MAMADROID: Detecting Android Malware by Building Markov Chains of Behavioral Models", arXiv:1612.04433v3 [cs.CR], NDSS 2017, Nov. 20, 2017, pp. 1-16.

Mirzaei et al., "AndrEnsemble: Leveraging API Ensembles to Characterize Android Malware Families", Session 4A: Mobile Security, AsiaCCS '19, Jul. 9-12, 2019, pp. 307-314.

Nomura et al., "Creating Family Tree of Android Malware", Computer Security Symposium 2020, Information Processing Society of Japan, Oct. 26-29, 2020, pp. 527-534 (8 pages including English Abstract).

* cited by examiner

GENERATION DEVICE, GENERATION METHOD, AND GENERATION PROGRAM

CROSS-REFERENCE TO RELATED APPLICATION

The present application is based on PCT filing PCT/JP2021/001920, filed Jan. 20, 2021, the entire contents of which are incorporated herein by reference.

TECHNICAL FIELD

The present invention relates to a generation device, a generation method, and a generation program.

BACKGROUND ART

In recent years, OS (Operating System) running on devices of the whole world are always targeted to attack by malware, and many new types of malwares have been found daily. For example, representative malware targeting Android that is popularized in the world includes adware, annoying application (PUA: Potentially Unwanted Application) Trojan horses, and ransomware and the like.

While the threat of malware becomes serious, many malware detection techniques have been proposed, and not only a method of detecting malware based on the signature and rule of known malware but also a method of detecting malware using machine learning have been proposed. For example, in a detection technique targeting malware with Android as a target (appropriately referred to as "Android malware"), there is research for inputting an Android application and performing binary classification for identifying whether the application is malware or not (for example, refer to NPL 1 to 3), and research for performing family classification (for example, refer to NPL 4).

CITATION LIST

Non Patent Literature

[NPL 1] Y. Aafer, W. Du, and H. Yin, "DroidAPIMiner: Mining API-Level Features for Robust Malware Detection in Android," in Security and Privacy in Communication Networks, 2013, pp. 86-103, doi: 10.1007/978-3-319-04283-1_6.
[NPL 2] D. Arp, M. Spreitzenbarth, M. Hubner, H. Gascon, K. Rieck, and C. Siemens, "DREBIN: Effective and explainable detection of android malware in your pocket," in Proc. NDSS, 2014.
[NPL 3] E. Mariconti, L. Onwuzurike, P. Andriotis, E. De Cristofaro, G. Ross, and G. Stringhini, "MAMADROID: Detecting Android Malware by Building Markov Chains of Behavioral Models," in Proc. NDSS, 2017.
[NPL 4] O. Mirzaei, G. Suarez-Tangil, J. M. de Fuentes, J. Tapiador, and G. Stringhini, "AndrEnsemble: Leveraging API Ensembles to Characterize Android Malware Families," in Proc. ACM Asia Conference on Computer and Communications Security, July 2019, vol. 25, pp. 307-314, doi: 10.1145/3321705.3329854.

SUMMARY OF INVENTION

Technical Problem

However, the above-described prior art has a problem that it may be unable to immediately specify the occurrence of a concept drift due to a change in time, or to more accurately detect malware without reducing detection accuracy.

The fact that the attack method and the family of malware increase with time and the property of data to be predicted greatly changes in machine learning is called "concept drift". Therefore, not only detection performance at a certain point of time but also robust detection performance considering time-series changes are important, but prior art related to detection of malware does not sufficiently consider concept drift, and the detection accuracy is reduced with the lapse of time under a practical condition where a time series change occurs. For example, in the case of a task "predicting the family name of malware", a concept drift occurs at the time when a new family which does not exist in the learning data appears, and accurate prediction may not be performed.

Solution to Problem

In order to solve the above-mentioned problem and to achieve the purpose, a generation device according to the present invention includes: generation circuitry configured to:
acquire information on software;
extract a feature quantity of the software from the information of the software;
generate a cluster for each software based on the feature quantity extracted and calculate a clustering result including a center of gravity of the cluster;
when a distance to the center of gravity of the cluster included in a past clustering result calculated from information on malware is equal to or less than a predetermined value, match the clustering result calculated with the past clustering result;
and generate a graph showing the relationship between the software and the malware on the basis of the result matched.

A generation method according to the present invention is a generation method executed by a generation device, and includes:
acquiring information on software;
extracting a feature quantity of the software from the information of the software;
generating a cluster for each software based on the feature quantity extracted, and calculating a clustering result including the center of gravity of the cluster;
matching the clustering result calculated with the past clustering result, when a distance to the center of gravity of the cluster included in the past clustering result calculated from information on malware is equal to or less than a predetermined value;
and generating a graph indicating the relationship between the software and the malware on the basis of the result matched.

A non-transitory computer-readable recording medium storing therein a generation program according to the present invention causes a computer to perform:
extracting a feature quantity of the software from the information of the software;
generating a cluster for each software based on the feature quantity extracted, and calculating a clustering result including the center of gravity of the cluster;
matching the clustering result calculated with the past clustering result, when a distance to the center of gravity of the cluster included in the past clustering result calculated from information on malware is equal to or less than a predetermined value;

and generating a graph indicating the relationship between the software and the malware on the basis of the result matched.

Advantageous Effects of Invention

According to the present invention, it is immediately specified that concept drift has occurred due to time change, and malware can be detected more accurately without reducing detection accuracy.

DESCRIPTION OF EMBODIMENTS

In the following, embodiments of a software family tree generation device (appropriately referred to as "generation device"), a software family tree generation method (appropriately referred to as "generation method"), and a software family tree generation program (appropriately referred to as "generation program") will be described in detail with reference to the drawings. Note that, the present invention is not limited to the embodiments to be described below.

First Embodiment

Hereinafter, the configuration of the software family tree generation system, the configuration of the software family tree generation device, the feature quantity extraction processing, the family tree generation processing, a specific example of a family tree, a flow of feature quantity extraction processing, a flow of family tree generation processing, a flow of concept drift detection processing, and a flow of learning data distribution processing will be described in order, and finally the effect of this embodiment will be described.

[Configuration of Software Family Tree Generation System]

Figure 1:
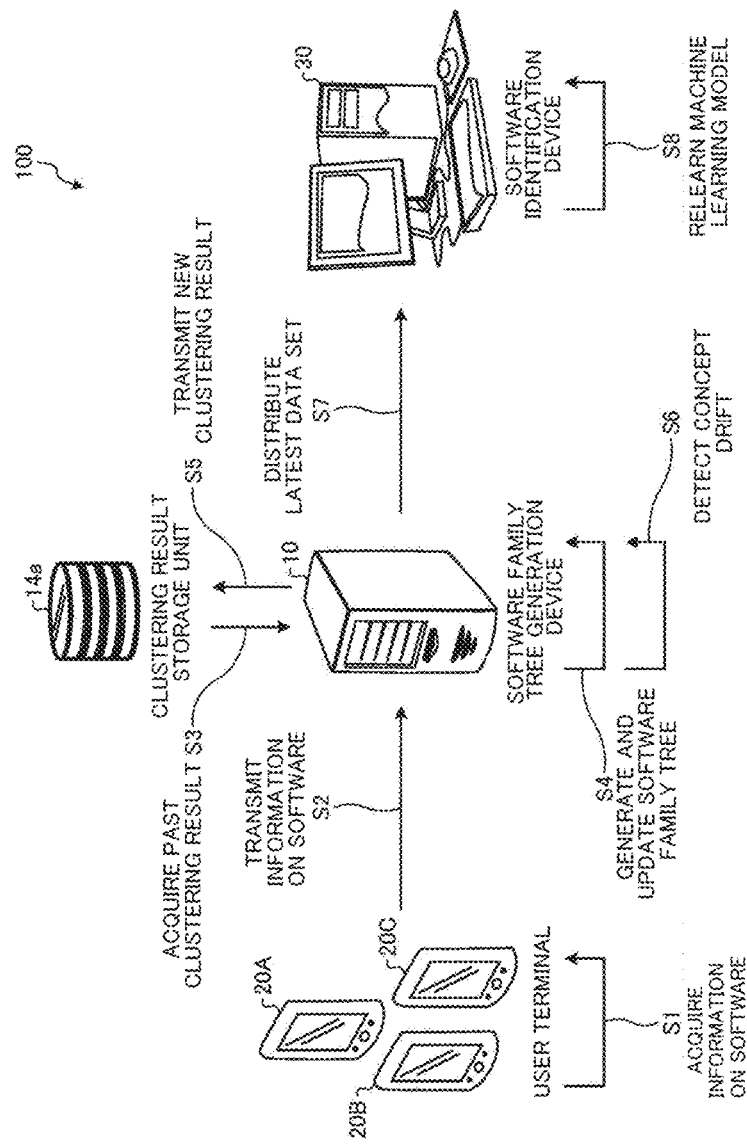
FIG. 1 is a diagram showing an example of the configuration of a software family tree generation system according to a first embodiment.

Referring to FIG. 1, a software family tree generation system (appropriately referred to as "the system") 100 will be described in detail. FIG. 1 is a diagram showing an example of a configuration of a software family tree generation system according to a first embodiment. The software family tree generation system 100 includes a software family tree generation device 10, user terminals 20 (20A, 20B, 20C) such as various terminals, and a software identification device 30. Here, the software family tree generation device 10, the user terminal 20 and the software identification device 30 are connected to each other via a predetermined communication network not shown, so as to be communicable by wire or radio. The software family tree generation system 100 shown in FIG. 1 may include a plurality of software family tree generation devices 10 and a plurality of software identification devices 30.

First, the user terminal 20 acquires information on software such as malware (step S1), and transmits the information to the software family tree generation device 10 (step S2). Here, the user terminal 20 is a PC (Personal Computer) which a general user owns, and a smart phone, a tablet terminal, or the like into which an OS such as Android is introduced, but is not particularly limited. The user terminal 20 may be a dedicated device for collecting information on malware.

Here, the software information is information including at least operation and structural characteristics of the software, but is not particularly limited. The software information also may be malware information processed using a prior art capable of identifying whether or not it is malware, or information including a suspicious application although it cannot be concluded as malware. Further, the software family tree generation device 10 can directly acquire information on software without the user terminal 20. Detailed software information acquisition processing by the software family tree generation device 10 will be described later in [Extraction Processing of Feature Quantity].

Next, the software family tree generation device 10 acquires a past clustering result calculated from information on malware or the like from a clustering result storage unit 14a (step S3). Here, the clustering result is information including the center of gravity of a cluster for each malware clustered by the software family tree generation device 10, but is not particularly limited. The clustering result may include information on the time series in which the malware is collected, a family name representing the type of the malware, a temporary label, or the like. The detailed clustering processing by the software family tree generation device 10 will be described later in [Family Tree Generation Processing], and the like.

Then, the software family tree generation device 10 generates a family tree of software expressing relationship and time series change among a plurality of software such as malware, from the past clustering result of the malware and updates it (step S4). Detailed software family tree generation processing by the software family tree generation device 10 and specific examples of the software family tree will be described later in [Family Tree Generation Processing] [Specific Example of Family Tree], and the like. The software family tree generation device 10 also transmits a clustering result of new malware or the like acquired in software family tree generation processing to a clustering result storage unit 14a (step S5).

Further, the software family tree generation device 10 detects the occurrence of a concept drift such as appearance of a family of new malware from the generated software family tree of malware or the like (step S6). Then, the software family tree generation device 10 distributes a data set which is learning data for identifying the latest malware or the like when the occurrence of the concept drift is detected (step S7). On the other hand, the software identification device 30 performs re-learning of a machine learning model for identifying software such as malware by using the latest data set as learning data (step S8). Detailed concept drift detection processing and data set distribution processing for re-learning by the software family tree generation device 10 will be described later in [Flow of Concept Drift Detection Processing and Learning Data Distribution Processing].

The software family tree generation system 100 according to the present embodiment automatically generates a so-called "family tree" capable of expressing the relationship between the ancestor and the progeny among a plurality of malware and the time-series change thereof. Therefore, in the system 100, it is possible to recognize what relation the newly appearing malware has with the past malware or family. In the system 100, a new family of families such as "mutation", which cannot be obtained from the relationship with the existing families appearing after a certain point of time, can be immediately specified. Further, in the system 100, when applying a technique for detecting malware, the occurrence of concept drift can be immediately specified by time variation.

In the system 100, the occurrence of concept drift is specified, and the machine learning model is re-learned. Therefore, the deterioration of the detection accuracy of the machine learning model for detecting malware can be eliminated.

[Configuration of Software Family Tree Generation Device]

Figure 2:
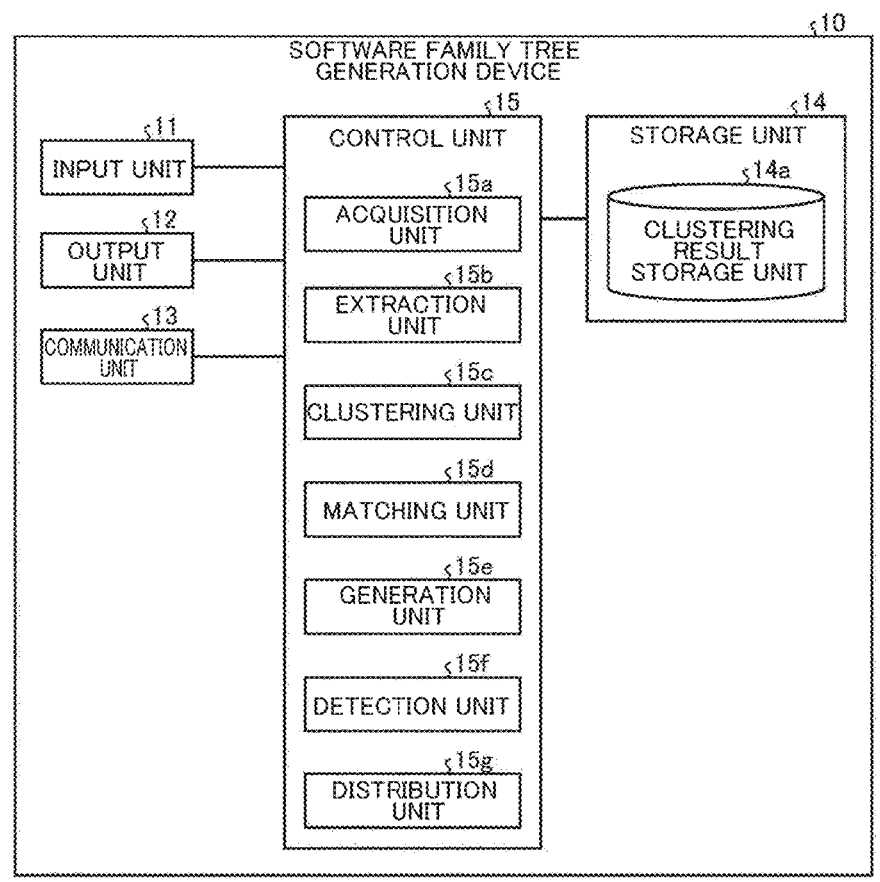
FIG. 2 is a block diagram showing a configuration example of a software family tree generation device according to the first embodiment.

The configuration of a software family tree generation device 10 according to the present embodiment will be described in detail with reference to FIG. 2. FIG. 2 is a block diagram showing a configuration example of the software family tree generation device according to the present embodiment. The software family tree generation device 10 includes an input unit 11, an output unit 12, a communication unit 13, a storage unit 14, and a control unit 15.

The input unit 11 controls input of various types of information into the software family tree generation device 10. The input unit 11 is, for example, a mouse, a keyboard, or the like, and receives input of setting information or the like to the software family tree generation device 10. The output unit 12 controls output of various types of information from the software family tree generation device 10. The output unit 12 is, for example, a display or the like, and outputs setting information or the like stored in the software family tree generation device 10.

The communication unit 13 performs data communication with another device. The communication unit 13 performs data communication with other communication devices, for example. Further, the communication unit 13 can perform data communication with a terminal of an operator, which is not illustrated.

The storage unit 14 stores various types of information which is referred to when the control unit 15 operates and various information obtained when the control unit 15 operates. The storage unit 14 has a clustering result storage unit 14a. Here, the storage unit 14 is, for example, a semiconductor memory device such as a RAM (Random Access Memory), a flash memory, or a storage device such as a hard disk or an optical disc. Note that, in the example shown in FIG. 2, the storage unit 14 is installed inside the software family tree generation device 10 but may be installed outside the extraction unit 10 and a plurality of storage units may be installed.

The clustering result storage unit 14a stores the clustering result calculated by the clustering unit 15c of the control unit 15. For example, the clustering result storage unit 14a stores, as a clustering result, an average (center of gravity of cluster) of a row vector representing the feature quantity belonging to the cluster when the past malware is clustered based on the feature quantity. Also, the clustering result storage unit 14a may store, as the clustering result, information on the time series in which the malware is collected, a family name indicating the type of the malware, a temporary label, or the like.

The control unit 15 performs control of the software family tree generation device 10 whole concerned. The control unit 15 includes an acquisition unit 15a, an extraction unit 15b, a clustering unit 15c, a matching unit 15d, a generation unit 15e, a detection unit 15f, and distribution unit 14g. Here, the control unit 15 is, for example, an electronic circuit such as a CPU (Central Processing Unit) or a MPU (Micro Processing Unit), or an integrated circuit such as an ASIC (Application Specific Integrated Circuit) or a FPGA (Field Programmable Gate Array).

The acquisition unit 15a acquires information of software. For example, the acquisition unit 15a acquires information on a plurality of pieces of software in the order of time series. The acquisition unit 15a acquires information including at least the operation and structural characteristics of software. Here, the acquisition unit 15a may acquire only the information of malware processed by using a conventional technique capable of identifying whether or not the information is malware as the information of the software, or may acquire information including a suspicious application, but which cannot be concluded as malware.

Further, the acquisition unit 15a may acquire information on software divided for each time series or the like and information on partial software. On the other hand, the acquisition unit 15a may store the data acquired into the storage unit 14. The acquisition unit 15a may acquire the information of the software recorded in the storage unit 14.

The extraction unit 15b extracts a predetermined feature quantity from the information acquired by the acquisition unit 15a. For example, the extraction unit 15b extracts the operation or structural characteristics of the software as the feature quantity of the software. An extraction unit 15b extracts a permission requested by software, or a package name and a class name of a source code of software, as a feature quantity of the software. On the other hand, the extraction unit 15b may store the feature quantity of the extracted software in a storage unit 14. The detailed extraction processing of the feature quantity of the software by the extraction unit 15b will be described later in [Extraction Processing of Feature Quantity].

The clustering unit 15c generates a cluster for each software on the basis of the feature quantity of the software extracted by the extraction unit 15b, and calculates a clustering result including the center of gravity of the cluster. For example, the clustering unit 15c generates a cluster by using an X-means method. The clustering unit 15c updates the past clustering result. For example, the clustering unit 15c stores a clustering result including the center of gravity of the cluster in a clustering result storage unit 14a, and updates the past clustering result. Detailed clustering processing by the clustering unit 15c will be described later in [Family Tree Generation Processing].

The matching unit 15d matches the clustering result calculated by the clustering unit 15c with the past clustering result when the distance to the center of gravity of the cluster included in the past clustering result calculated from the information of malware is equal to or less than a prescribed value. For example, a matching unit 15d matches the clustering result by using a k-nearest neighbors algorithm. On the other hand, the matching unit 15d may store the matching result in the storage unit 14. The matching unit 15d may refer to the past matching result recorded in the storage unit 14. The detailed matching processing of the cluster by the matching unit 15d will be described later in [Family Tree Generation Processing].

The generation unit 15e generates a graph showing the relationship between the software and the malware on the basis of the result of matching by the matching unit 15d. For example, the generation unit 15e connects the node corresponding to the clustering result matched by the matching unit 15d and the node corresponding to the past clustering result by edges in the order of time series. On the other hand, the generation unit 15e may store the generated graph in the storage unit 14. The generation unit 15e may refer to the graph generated in the past recorded in the storage unit 14. The detailed graph generation processing by the generation unit 15e will be described later in [Family Tree Generation Processing].

The detection unit 15f detects a change in the property of the software. For example, the detection unit 15f, when a node not connected to any past node appears for a new node generated by the generation unit 15e, determines that a concept drift has occurred. The detection unit 15f also when the new node generated by the generation unit 15e is a predetermined distance or more from any past node, determines that a large change has occurred in malware with the lapse of time, and a concept drift has occurred.

The distribution unit 15g distributes learning data to a machine learning model for identifying software on the basis of a change in the property of the software detected by the detection unit 15f. For example, when the detection unit 15f detects occurrence of concept drift such as appearance of new malware or large change of malware with time lapse, the distribution unit 15g creates the latest data set including a correct label and a temporary label representing new malware as learning data, and distributes the learning data to a machine learning model for identifying malware.

[Extraction Processing of Feature Quantity]

Figure 3:
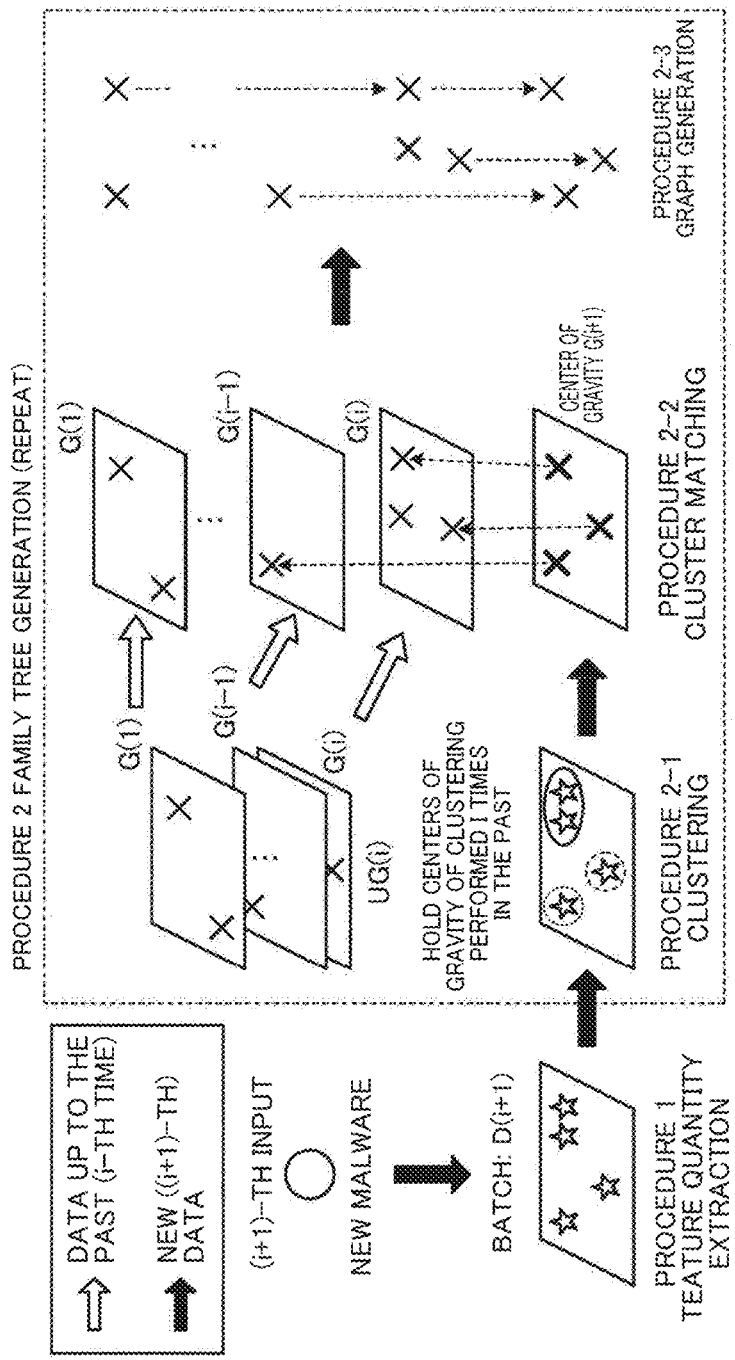
FIG. 3 is a diagram showing an outline of feature quantity extraction processing and family tree generation processing according to the first embodiment.

Referring to procedure 1 of FIG. 3, the feature quantity extraction processing according to the present embodiment will be described in detail. Procedure 1 in FIG. 3 shows the outline of the feature quantity extraction processing according to the first embodiment. In procedure 1, the software family tree generation device 10 extracts a "feature quantity" from each input application so as to capture the feature in the operation and structure thereof. In the following description, a permission requested by malware (feature quantity 1), and a package name and a class name of a source code (feature quantity 1) will be described, but not limited to.

Definition of Term

It is assumed that the software family tree generation device 10 accepts up to the i-th input of $\{1, \ldots, i-1, i\}$ as information on past malware, and the (i+1)-th input as information on new malware. Also, the feature quantity of each application (malware) shall be expressed as data D. D is defined in a matrix form, each row corresponds to one application, and each column corresponds to one feature quantity.

It is also assumed that each row of the data D is arranged in the order of appearance of malware. Each row of D, i.e., the feature quantity of each malware represented by a row vector is referred to as "sample", and each sample is represented by a vector of the feature quantity.

Further, a partial matrix $\{D(1), D(2), \ldots, D(m)\}$ obtained by dividing the data D into m row units in the time series order, i.e., in the row number order by row unit, without duplication, is referred to as a "batch", and a batch is a matrix of multiple malware features. The batch obtained from the information of the i-th malware is denoted as D(i), where $i \in \{1, 2, \ldots, m\}$.

In procedure 1 of FIG. 3, the software family tree generation device 10 accepts the (i+1)-th input, as an input of a new malware, and extracts the feature quantity as the batch D(i+1).

(Feature Quantity 1)

A processing of extracting a permission requested by malware as the feature quantity extracted in the procedure 1 of FIG. 3 will be described in detail. The permission indicates various authorities requested to the user for the operation of the application. For example, the permission requested by the Android malware can be obtained from the manifest file (AndroidManifest.xml), and when the Android malware requests access to the Internet, the permission "android.permission.INTERNET" is described in the XML (Extensible Markup Language) file.

The software family tree generation device 10 extracts feature quantities by performing the following processing on the description of the above-mentioned permission. First, the software family tree generation device 10 divides the description of the permission by periods and makes the appearing permission name into tokens.

Next, the software family tree generation device 10 sets a feature quantity corresponding to a token to "1" when the token appears for a permission requested by a certain malware. The method of constructing this feature is known as a one-hot encoding method. Further, the software family tree generation device 10 may add a processing of excluding the token (example: "android", "permission") which generally appear frequently from the feature quantities regardless of the contents of the requested permission.

(Feature Quantity 2)

The processing for extracting the package name and the class name (file name) of the source code as the feature quantity extracted in procedure 1 of FIG. 3 will be described in detail. The following description will be made with reference to examples of Android applications, but application (malware) is not particularly limited.

An Android application can be decompiled including the source code and its directory structure (the structure of packages in Java (registered trademark)). For example, as a result of the inverse compilation of a source code of an Android application, there may be a case where a name space of a class and a package such as "com.example.myfirstapp.MainActivity (.java)" can be obtained. When attention is paid to the name space of the package obtained as a result of the inverse compilation, various information such as TLD (Top Level Domain) for each country, a developer of a library, a class name, and the like, which are conventionally given, can be obtained.

The software family tree generation device 10 takes into consideration the name space of the package structure as described above, and performs the following processing to extract the feature quantity. First, the software family tree generation device 10 takes out the package structure and class name of each file of source codes obtained by inverse compilation by paying attention to the API (Application Programming Interface) provided by the Android SDK (Software Development Kit). The software family tree generation device 10 may add a processing of extracting the package structure and the class name limitedly from the API which is related to the operation of malware.

Next, the software family tree generation device 10 divides the obtained name space by periods, makes them into tokens in the same manner as the processing using the above-mentioned permission, and extracts the tokens as a feature quantity by an one-hot encoding method. Further, the software family tree generation device 10 may add a processing of excluding a token (example: "android", "permission") which generally appear frequently from the feature quantity.

(Extraction Processing of Other Feature Quantity)

The software family tree generation device 10 can also perform processing other than the above-described feature quantity extraction processing. For example, the software family tree generation device 10 can perform, as well as processing of extracting a permission, a package name and a class name based on the static analysis as described above, processing using a dynamic analysis result, processing using information that can be acquired in a market where an application is arranged, processing using information related to a user using the application, or the like.

[Family Tree Generation Processing]

The family tree generation processing according to the present embodiment will be described in detail with reference to the procedure 2 of FIG. 3. Procedure 2 in FIG. 3 shows the outline of the family tree generation processing according to the first embodiment. In procedure 2, the software family tree generation device 10 performs three processes, namely, a clustering process (procedure 2-1), a clustering process (procedure 2-2), a cluster matching process (procedure 2-1).

The software family tree generation device 10 continues to generate the latest family tree of malware by repeatedly executing procedure 2 each time the feature quantity of a new application is input. Specifically, the software family tree generation device 10 creates a family tree by repeating a procedure for matching the clustering result of the past generation with the clustering result of the new generation. Therefore, malware which is newly obtained daily and has not been sufficiently analyzed can be associated with malware obtained in the past.

In the following description, in view of the fact that a concept drift occurs in which a malware of a new family other than a family known so far appears with time, clustering in an approach of unsupervised learning instead of an approach of supervised learning considering classification into a predetermined class is applied, but not limited to. The clustering or grouping method may be another method.

(Clustering Processing)

In the procedure 2 of FIG. 3, the clustering processing of malware will be described in detail. The software family tree generation device 10 clusters a plurality of malware obtained in the time series order on the basis of the feature quantity extracted in the procedure 1 of FIG. 3. In the following clustering process, an example using the X-means method capable of automatically determining the optimum number of clusters is described, but the clustering process is not particularly limited.

First, the software family tree generation device 10 clusters a set of samples consisting of the entire row vector of the batch D(i) by using the X-means method, and generates c(i) clusters.

Next, the software family tree generation device 10 calculates the average of row vectors representing the feature quantities of the samples belonging to each cluster, and obtains the center of gravity of each cluster of c(i) clusters. At this time, the set of the centers of gravity of the clusters is denoted as G(i)={g(i, 1), g(i, 2), . . . , g(i, c(i))}. And The union set UG(i) is denoted as expression (1). In other words UG(i) summarizes the center of gravity of the clusters generated when the clustering process is performed on batches {D(1), D(2), . . . , D(i)}.

[Expression 1]

$$\bigcup G(i) = \bigcup_{j=1}^{i} G(j) \qquad (1)$$

In the example of the procedure 2-1 in FIG. 3, the software family tree generation device 10 maintains UG(i), a set of centers of gravity of cluster {G(1), . . . , G(i−1), G(i)} obtained by the clustering process conducted i times in the past, as a past clustering result. In the example of the procedure 2-1 of FIG. 3, the software family tree generation device 10 clusters the batch D(i+1) as the feature quantities of the four malwares obtained in time series order, generates clusters corresponding to three types of malwares, and calculate the average of the feature quantities belonging to each cluster as the center of gravity of each cluster.

Further, the software family tree generation device 10 adds the set of the centers of gravity of cluster G(i+1) calculated from batch D(i+1) to UG(i), and updates the past clustering results.

(Matching Processing of Cluster)

The cluster matching processing in procedure 2 of FIG. 3 will be described in detail. The software family tree generation device 10 performs cluster matching processing based on the center of gravity of each cluster calculated in the procedure 2-1 of FIG. 3. Here, the software family tree generation device 10 performs processing for searching for a result close to a current clustering result from past clustering results. In the following cluster matching processing, an example of using the k-nearest neighbors algorithm is described as a method for searching for nearby elements, but the cluster matching processing is not particularly limited.

The software family tree generation device 10 uses a k-nearest neighbors algorithm to search k neighbors from elements of UG(i), for each of c(i+1) centers of gravity {g (i+1, 1), g (i+1, 2), . . . g(i+1, c(i+1))} of a element of the G(i+1) obtained newly by above-described clustering processing (matching processing). At this time, the software family tree generation device 10 uses the Euclidean distance as the distance function of the k-nearest neighbors algorithm, but is not particularly limited.

As a result of the matching processing, for a center of gravity g (i+1, 1) of D(i+1), a set Neighbor (i+1, 1) having k neighbors searched from UG(i) as elements, and a set Distance (i+1, 1) having distances of these neighbors with g(i+1, 1) are obtained. It is noted that, l∈ {1, 2, . . . c(i+1)}. Further, the software family tree generation device 10 can arbitrarily set the number of neighbor to be searched k.

In the example of the procedure 2-2 of FIG. 3, the software family tree generation device 10 gets {G(1), . . . , G(i−1), G(i)} from the past clustering results UG(i), and for each of the centers of gravity of the three clusters that are elements of G(i+1), searches one neighborhood from the elements of UG(i).

Further, the software family tree generation device 10 may hold Neighbor (i+1), Distance (i+1, 1) as matching results and update for each matching processing.

(Graph Generation Processing)

In the procedure 2 shown in FIG. 3, the graph generation processing will be described in detail. The software family tree generation device 10 performs generation processing of a graph representing the family tree of malware based on the result of the matching process obtained in the procedure 2 of FIG. 3. The process of generating the graph performed by the software family tree generation device 10 is not particularly limited.

In the following example, the family tree P=(N, E) is defined by a directed graph. Here, N indicates a node, and corresponds to the element of the set of the center of gravity of cluster UG(i) in a one-to-one manner. In addition, E represents an edge, holds the distance d, and the direction of the edge represents the direction of time.

First, the software family tree generation device 10 generates a node n (i+1, 1) corresponding to the center of gravity g (i+1, 1) of c (i+1) clusters obtained from D(i+1). It is noted that, l∈{1, 2, . . . , c (i+1)}.

Next, the software family tree generation device 10 connects the above-described node to the node which corresponds to the center of gravity in the past, and is an element of the Neighbor (i+1, L) with an edge.

At this time, processing that the threshold value θ of the distance is used as a parameter, and when the distance exceeds the threshold value θ, the edge connection is disconnected, may be added. By executing this operation, nodes of clusters closer to the node of the node are connected, and the relation between clusters keeping time series can be shown as the edge of the family tree.

In the example of the procedure 2-3 of FIG. 3, the software family tree generation device 10 connects each of nodes (represented by symbol x) corresponding to the centers of gravity of three clusters with edges (represented by dashed arrows) indicating the direction of time, from the result of the past clustering processing, and creates a graph representing the family tree of malware. In the example of the procedure 2-3 of FIG. 3, the software family tree generation device 10 generates the software family tree based on up to the past (i-th time) data Neighbor (i, 1) holding nodes and edges generated past.

Further, the software family tree generation device 10 may hold a graph representing the family tree of malware as a result of graph generation processing, and update the graph for each graph generation processing.

[Specific Example of Family Tree]

Figure 4:
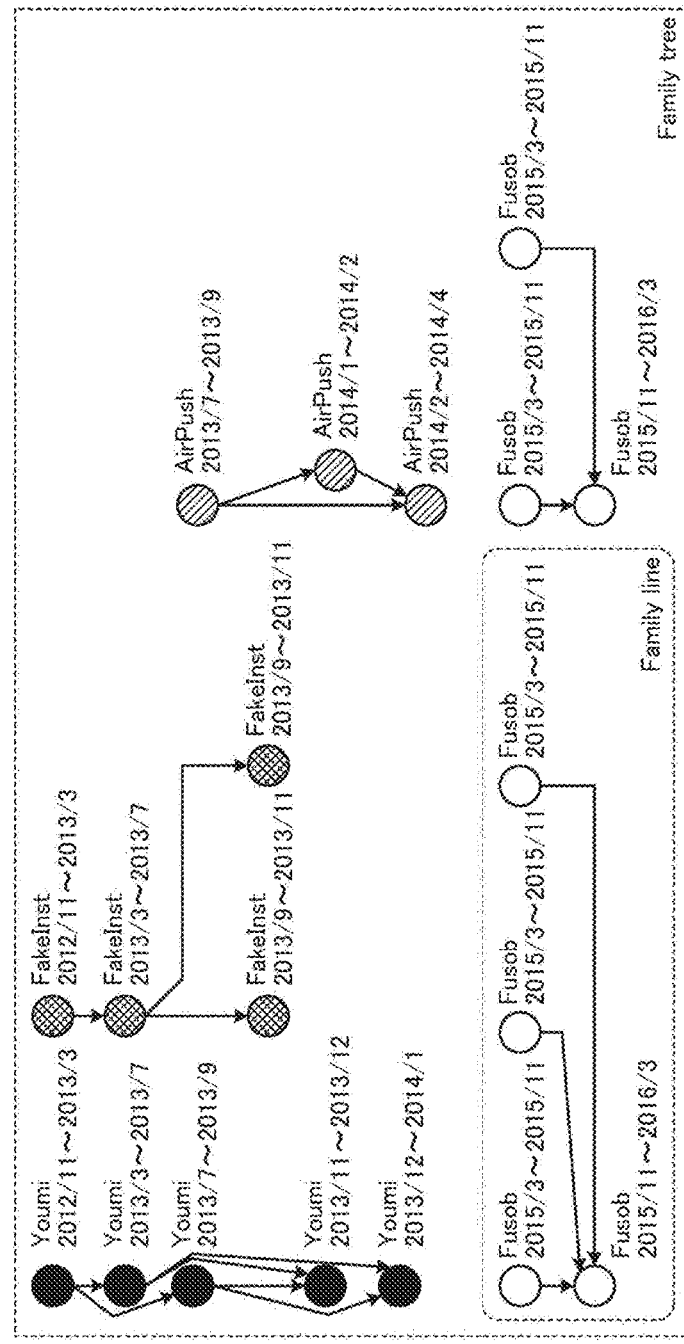
FIG. 4 is a diagram showing an example of family tree generation processing according to the first embodiment.

Referring to FIG. 4, an example of a family tree according to this embodiment will be described in detail. FIG. 4 is a diagram showing an example of a family tree according to the first embodiment. In FIG. 4, a set of nodes connected to a node is "family line" (the portion of the diagram represented as "Family line"), a whole diagram including a plurality of family lines is "family tree". The graph shows that the time progresses as it goes downward. The color and pattern of the node indicates the largest family in the cluster corresponding to the node. In the family tree, the clusters of related malwares are connected by the same family line as shown in the figure, and the related malware can be easily associated with the past malware by tracing the edge in the reverse direction.

Note that, in the example shown in FIG. 4, the family name ("Youmi", "FakeInst", "AirPush", "AirPush", "Fusob") is described, at the point of time when a family tree is actually created, a family name for past malware is obtained but a family name of a new kind of malware likely to be not known. Since the family name is not used at all in the procedures 1 and 2 for creating the family tree, the family tree can be created even in a stage where the family name is not given by the anti-virus vendor, and the relationship with the past malware and family can be known to some malware.

By using the family tree of the malware shown in FIG. 4, it is possible to recognize the relationship between the newly obtained malware and the past malware and the family. For example, in FIG. 4, when a family tree which has connection from node of malware newly input in January 2013 (the malware has not yet determined as "FakeInst" at the input point of time) to the node at bottom right of "FakeInst" family (family line of the reticulated node present in the center of FIG. 4) is generated, it can be recognized that the input malware has a relation to "FakeInst" family.

By using the family tree of malware shown in FIG. 4, the appearance of a family of new malware can be observed. For example, in FIG. 4, it is understood that "Fusob" family (the family line of the white nodes independently present on the lower side of the FIG. 4) appear after 2015 years, and they are not connected to the existing family lines or families. Therefore, it is possible to know that a new family of family having a low relation to the past malware family has appeared at a certain point of time.

[Flow of Extraction Processing of Feature Quantity]

Figure 5:
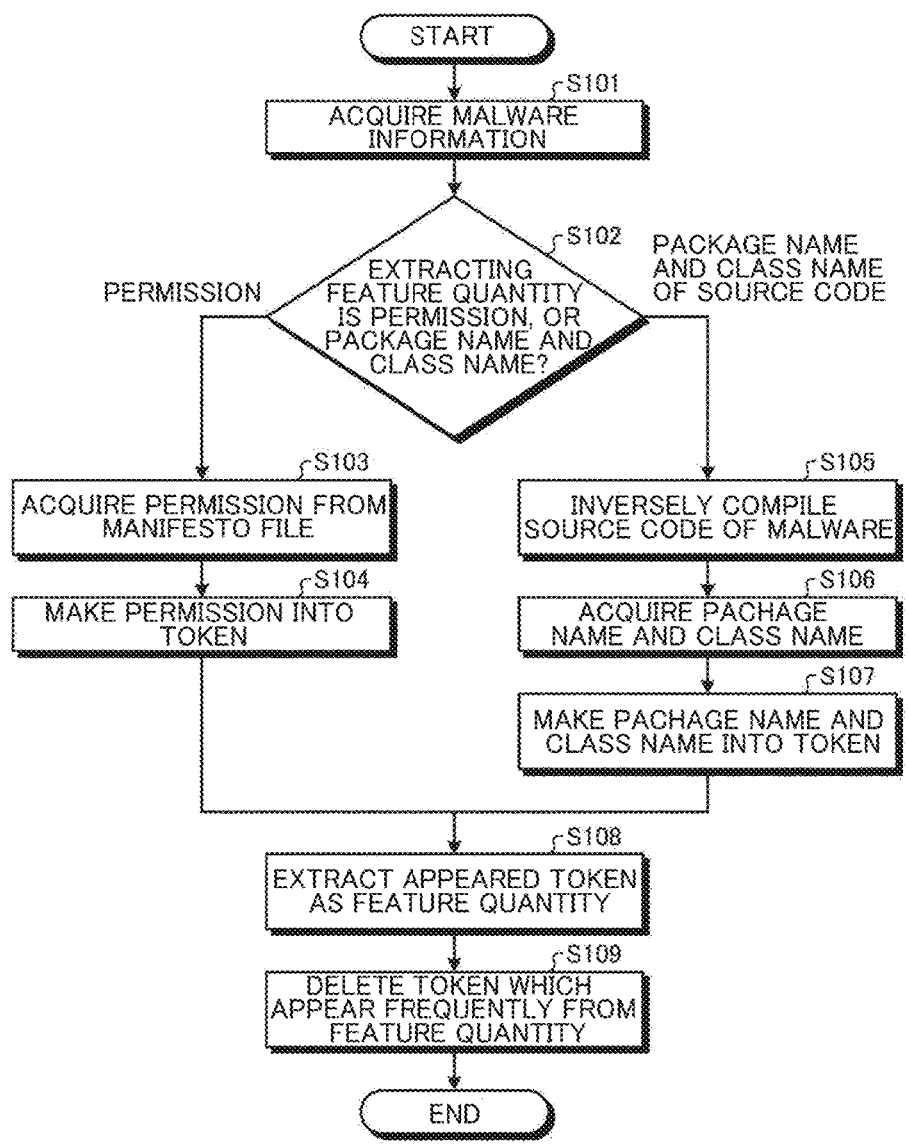
FIG. 5 is a flowchart showing an example of a flow of feature quantity extraction processing according to the first embodiment.

Referring to FIG. 5, the flow of the feature quantity extraction processing according to the present embodiment will be described in detail. FIG. 5 is a flow chart showing an example of the flow of the feature quantity extraction processing according to the first embodiment. First, the acquisition unit 15a of the software family tree generation device 10 acquires information on malware from a user terminal 20 (step S101). At this time, the acquisition unit 15a may acquire information from equipment other than the user terminal 20. The acquisition unit 15a may acquire information directly input through the input unit 11.

Next, when the feature quantity of the malware to be extracted is a permission requested by the malware (step S102: permission), the extraction unit 15b acquires a permission from a manifesto file (step S103), make the permission into tokens (step S104), extracts the appearing token as a feature quantity (step S108). The extraction unit 15b excludes tokens appearing frequently from the feature quantity (step S109), then the processing is finished.

On the other hand, when the feature quantity of malware to be extracted is the package name and the class name of the source code (step S102: package name and class name of the source code), an extraction unit 15b performs inverse compilation of the source code of malware (step S105), acquires the package name and the class name (step S106), makes the package name and the class name into tokens (step S107), and extracts the appearing token as a feature quantity (step S108). The extraction unit 15b excludes tokens appearing frequently from the feature quantity (step S109), then the processing is finished.

The extraction unit 15b can also extract a permission required by malware and the package name and the class name of the source code together as the feature quantity of the malware.

[Flow of Family Tree Generation Processing]

Figure 6:
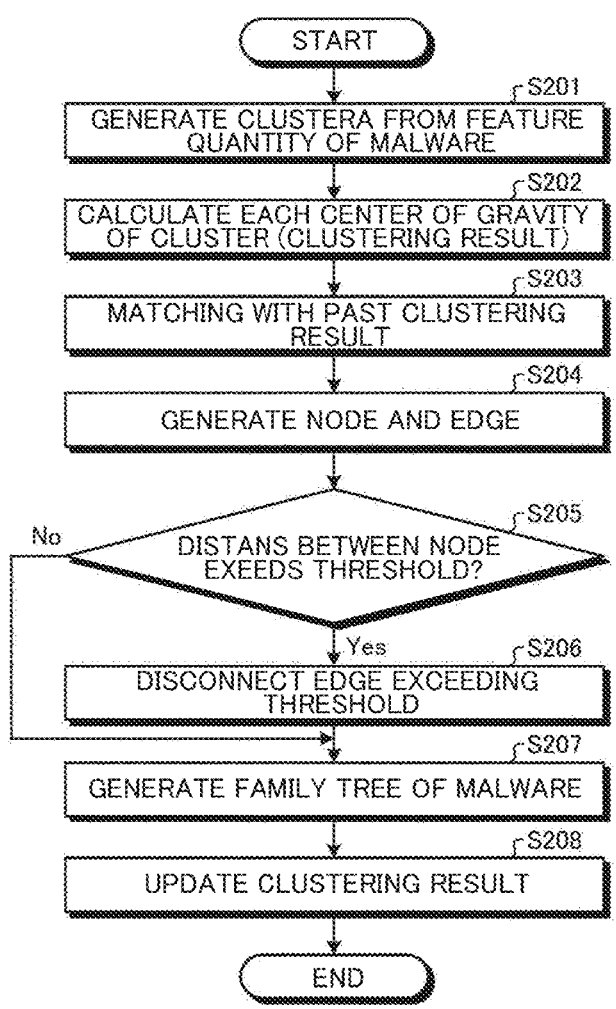
FIG. 6 is a flowchart showing an example of a flow of family tree generation processing according to the first embodiment.

Referring to FIG. 6, the flow of the family tree generation processing according to the present embodiment will be described in detail. FIG. 6 is a flowchart showing an example of the flow of the family tree generation processing according to the first embodiment. First, a clustering unit 15c of the software family tree generation device 10 generates a cluster from the feature quantity of malware extracted by the extraction unit 15b (step S201), and calculates a clustering result including the center of gravity of each cluster (step S202).

Next, a matching unit 15d matches the clustering result calculated by the clustering unit 15c with the past clustering result (step S203). Then, the generation unit 15e connects nodes corresponding to the clusters with edges on the basis of the result of matching by the matching unit 15*d*, and creates a graph representing the family tree of malware (step S204).

The generation unit 15*e* also when the distance between nodes of generated graph exceeds the threshold set (step S205: Affirmative), disconnects the edge exceeding the threshold (step S206).

Then, the generation unit 15*e* generates a family tree of malware (step S207), and displays the family tree via the output unit 12. At this time, the generation unit 15*e* may display the node by changing the color of the node for each family name or type of malware, or may display the family name or appearance time.

Finally, a clustering unit 15*c* stores the clustering result calculated from the feature quantity of the new malware in the clustering result storage unit 14*a*, updates the past clustering result (step S208), then the processing is finished. The clustering unit 15*c* may perform the processing of the step S208 before the processing by the matching unit 15*d* or the processing by the generation unit 15*e*.

The matching unit 15*d* may store the result of the matching processing in the storage unit 14 or may refer to the result of the past matching processing stored in the storage unit 14. The generation unit 15*e* may store the generated graph in the storage unit 14 or may refer to the graph generated in the past stored in the storage unit 14.

[Flow of Concept Drift Detection Processing and Learning Data Distribution Processing]

Figure 7:
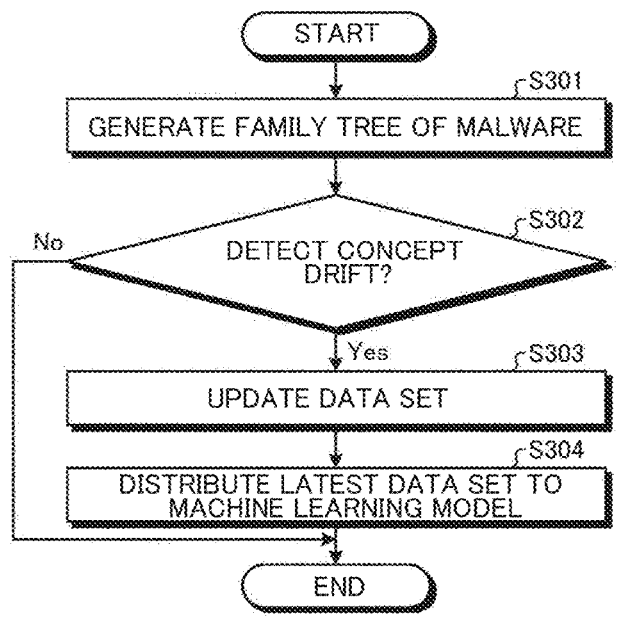
FIG. 7 is a flowchart showing an example of a flow of concept drift detection processing according to the first embodiment.

The flow of the concept drift detection processing and the learning data distribution processing according to the present embodiment will be described in detail with reference to FIG. 7. FIG. 7 is a flowchart showing an example of the flow of the concept drift detection processing and the learning data distribution processing according to the first embodiment. First, a generation unit 15*e* of the software family tree generation device 10 generates a family tree of malware using nodes and edges (step S301).

Next, the detection unit 15*f* when occurrence of the concept drift is detected based on the family tree generated by the generation unit 15*e* (step S302: Affirmative), constructs the latest data set as the learning data from latest information of malware (step S303). For example, when the detection unit 15*f*, when detecting, for nodes in the family tree, appearance of a node (appropriately referred to as "new node") that is not connected to any past node in each input batch, if the number of malwares belonging to the new node is equal to or more than a certain number, determines that the concept drift occurs. The detection unit 15*f* constitutes the latest data set including a correct answer label and a temporary label showing a new kind of malware and the like.

Finally, a distribution unit 15*g* distributes the latest data set constituted by the detection unit 15*f* to the machine learning model of the software identification device 30 (step S304), and then processing is finished.

By above-described performing the concept drift detection processing and learning data distribution processing, when operating a machine learning model for detecting malware, an appearance of a new type of malware family appears with the lapse of time, and timing at which the concept drift occurs are immediately specified, so that re-learning can be performed before the detection accuracy of the machine learning model is deteriorated.

For example, consider a machine learning model for performing multi-class classification for predicting to which family a certain malware belongs. At this time, when a new node appears for nodes in the family tree obtained by the present invention, it is considered that concept drift occurs, and the latest data set is constituted, the machine learning model is re-learned. Therefore, even if the latest data set is not prepared each time, it is sufficient to prepare the data set only when a concept drift which may deteriorate the accuracy of the machine learning model occurs, and the operation cost of the machine learning model can be reduced.

Effects of First Embodiment

First, in the software family tree generation processing according to the present embodiment, information on software is acquired, a feature quantity of software is extracted from the acquired information on software, a cluster for each software is generated on the basis of the extracted feature quantity, a clustering result including the center of gravity of the cluster is calculated, and when a distance to the center of gravity of the cluster included in the past clustering result calculated from the malware information is equal to or less than a predetermined value, matching the result of the clustering with the past result of clustering, and generating a graph representing the relationship between the software and the malware on the basis of the result of the matching are performed. Therefore, in this processing, it is immediately specified that concept drift occurs due to time change, and malware can be detected more accurately without lowering detection accuracy.

Second, in above-described software family tree generation processing according to the present embodiment, information on a plurality of pieces of software is acquired in time series order, operation or structural characteristics of the software are extracted as feature quantities of the software, the past clustering result is further updated, and the nodes corresponding to the matched clustering result and the nodes corresponding to the past clustering result are connected by edges in the order of time series. Therefore, in the present processing, it is possible to immediately specify that concept drift occurs due to time change more effectively, and to more accurately detect malware without reducing detection accuracy.

Third, in above-described software family tree generation process according to the present embodiment, the permission required by the software or the package name and class name of the source code of the software are extracted as the feature quantity of the software. Therefore, in this processing, it is possible to more efficiently and immediately specify that concept drift occurs due to time change, and to more accurately detect malware without reducing detection accuracy.

Fourth, in above-described software family tree generation process according to the present embodiment, clusters are generated by using the X-means method, and the clustering results are matched by using the k-nearest neighbors algorithm. Therefore, in this processing, it is immediately specified that concept drift occurs due to time change more accurately, and malware can be detected more accurately without lowering detection accuracy.

Fifth, in the software family tree generation process according to the present embodiment, a change in the property of software is detected, and learning data is distributed to a machine learning model for identifying software based on the detected change in the property. Therefore, in the present processing, it is immediately specified that concept drift occurs due to time change, and even if learning of a machine learning model is not frequently performed, thus, malware can be detected more accurately.

[System Structure etc.]

Each component of each device shown according to the foregoing embodiment is based on a functional concept and does not necessarily have to be physically configured as shown. That is, the specific forms of distribution and integration of the devices are not limited to the forms illustrated in the figures, and all or part of them can be configured by functionally or physically distributing and integrating them in any unit according to various loads, use situations, or the like. In addition, all or any part of the processing functions performed by the devices may be achieved by a CPU and programs analyzed and executed by the CPU or achieved as the wired logic of hardware.

Also, out of the steps of processing described in the foregoing embodiment, all or some of the steps of processing described as being automatically executed may also be manually executed. Alternatively, all or some of the steps of processing described as being manually executed may also be automatically executed using a known method. In addition, the processing procedure, the control procedure, specific names, information including various data and parameters that are shown in the above document and drawings may be arbitrarily changed unless otherwise described.

[Program]

In addition, a program that describes processing executed by the extraction device 10 described in the foregoing embodiment in a computer-executable language can be created. In this case, the same effects as in the above embodiment may be exhibited by a computer executing the program. Furthermore, processes similar to those of the foregoing embodiment may be also realized by recording the creation program in a computer-readable recording medium, and causing a computer to load and execute the creation program recorded in this recording medium.

Figure 8:
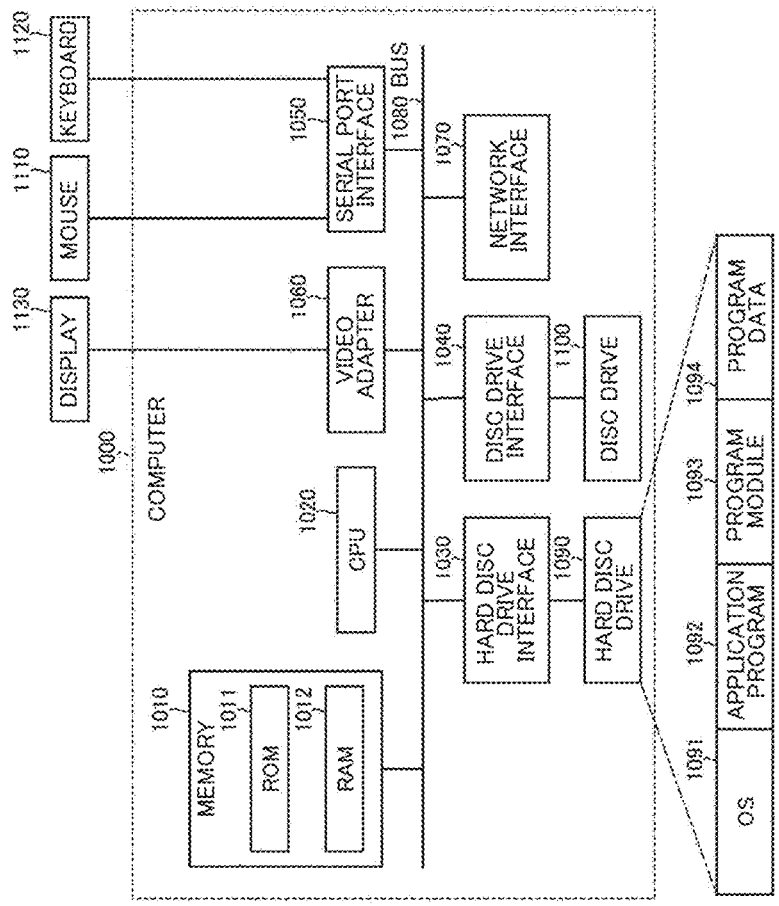
FIG. 8 is a diagram showing a computer that executes a program.

FIG. 8 illustrates a computer that performs a program. As exemplified in FIG. 8, a computer 1000 includes, for example, a memory 1010, a CPU 1020, a hard-disk drive interface 1030, a disk drive interface 1040, a serial port interface 1050, a video adapter 1060, and a network interface 1070, and these units are connected to each other via a bus 1080.

Memory 1010 includes ROM (Read Only Memory) 1011, and RAM 1012. ROM 1011 stores a boot program, such as a BIOS (Basic Input Output System). As illustrated in FIG. 8, the hard disk drive interface 1030 is connected to a hard disk drive 1090. As illustrated in FIG. 8, the disk drive interface 1040 is connected to a disk drive 1100. For example, a removable storage medium such as a magnetic disk or an optical disk is inserted in the disk drive 1100. As illustrated in FIG. 8, the serial port interface 1050 is connected to a mouse 1110 and a keyboard 1120, for example. As illustrated in FIG. 8, the video adapter 1060 is connected to, for example, a display 1130.

Here, as illustrated in FIG. 8, the hard disk drive 1090 stores, for example, an OS 1091, an application program 1092, a program module 1093, and program data 1094. That is to say, the above-described program is stored in, for example, the hard disk drive 1090 as a program module containing instructions to be executed by the computer 1000.

Also, various types of data described in the foregoing embodiment may be stored as program data, in the memory 1010 or the hard disk drive 1090, for example. In addition, the CPU 1020 reads the program module 1093 or the program data 1094 stored in the memory 1010 or the hard disk drive 1090 onto the RAM 1012 as needed, and executes various types of processing procedures.

Note that the program module 1093 and program data 1094 related to the program are not limited to being stored in the hard disc drive 1090, and may also be stored in, for example, a removable storage medium and read out by the CPU 1020 via the disc drive 1041, etc. Alternatively, the program module 1093 and the program data 1094 related to the program may be stored in another computer connected via a network (LAN (Local Area Network), WAN (Wide Area Network) or the like), and may be read by the CPU 1020 via the network interface 1070.

The above-described embodiment and modification thereof are included in the technology disclosed by the present application, as well as in the scope of the invention described in the claims and the equivalent range.

REFERENCE SIGNS LIST

10 Software family tree generation device (Generation device)
11 Input unit
12 Output unit
13 Communication unit
14 Storage unit
14a Clustering result storage unit
15 Control unit
15a Acquisition unit
15b Extraction unit
15c Clustering unit
15d Matching unit
15e Generation unit
15f Detection unit
15g Distribution unit
20, 20A, 20B, 20C User terminal
30 Software identification device
100 Software family tree generation system

The invention claimed is:

1. A generation device comprising:
generation circuitry configured to:
  acquire information on software;
  extract a feature quantity of the software from the information of the software acquired;
  generate a cluster for the software based on the feature quantity extracted, and calculate a clustering result including a center of gravity of the cluster;
  match the clustering result calculated with a past clustering result when a distance between a center of gravity of a cluster included in the past clustering result calculated from information on malware is equal to or less than a predetermined value; and
  generate a graph representing a relationship between the software and the malware based on a result of matching, and
  output the generated graph to a display,
  wherein the generation circuitry is further configured to:
acquire information on a plurality of pieces of software in a time series order;
extract an operation or structural characteristic of the software as the feature quantity;
further update the past clustering result;
  and connect a node corresponding to the clustering result matched and the node corresponding to the past clustering result by edges in a time series order.

2. The generation device according to claim 1, wherein the generation circuitry is further configured to:
  extract, as the feature quantity, a permission requested by the software, or a package name and a class name of a source code of the software.

3. The generation device according to claim 2, wherein the generation circuitry is further configured to:
  generate the cluster using an X-means method;
  and match the clustering result using a k-nearest neighbors algorithm.

4. The generation device according to claim 1, further comprising:
  detection circuitry configured to detect a change in a property of the software; and
  distribution circuitry configured to distribute learning data to a machine learning model for identifying software based on the change of the property detected.

5. A generation method, comprising:
  acquiring information on software;
  extracting a feature quantity of the software from the information of the software acquired in the acquisition step;
  generating a cluster for the software based on the feature quantity extracted, and calculating a clustering result including a center of gravity of the cluster;
  matching the clustering result calculated with a past clustering result when a distance between the center of gravity of the cluster included in the past clustering result calculated from information on malware is equal to or less than a predetermined value;
  and generating a graph representing the relationship between the software and the malware based on the result of matching, wherein
  the acquiring includes acquiring information on a plurality of pieces of software in a time series order,
  the extracting includes extracting an operation or structural characteristic of the software as the feature quantity,
  the generating of the cluster includes further updating the past clustering result, and
  the generating of the graph includes connecting a node corresponding to the clustering result matched and the node corresponding to the past clustering result by edges in a time series order.

6. A non-transitory computer-readable recording medium storing therein a generation program causing a computer to execute a process comprising:
  acquiring information on software;
  extracting a feature quantity of the software from the information of the software acquired;
  generating a cluster for each of the software based on the feature quantity extracted, and calculating a clustering result including a center of gravity of the cluster;
  matching the clustering result calculated with a past clustering result when a distance between a center of gravity of a cluster included in the past clustering result calculated from information on malware is equal to or less than a predetermined value;
  and generating a graph representing a relationship between the software and the malware based on a result of matching, wherein
  the acquiring includes acquiring information on a plurality of pieces of software in a time series order,
  the extracting includes extracting an operation or structural characteristic of the software as the feature quantity,
  the generating of the cluster includes further updating the past clustering result, and
  the generating of the graph includes connecting a node corresponding to the clustering result matched and the node corresponding to the past clustering result by edges in a time series order.

* * * * *